(12) United States Patent
Saeki et al.

(10) Patent No.: US 10,962,105 B2
(45) Date of Patent: Mar. 30, 2021

(54) CONTROL DEVICE FOR VEHICLE

(71) Applicant: Honda Motor Co., Ltd., Tokyo (JP)

(72) Inventors: Atsuhiro Saeki, Saitama (JP); Takayuki Kishi, Saitama (JP); Mitsuhiro Araki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 34 days.

(21) Appl. No.: 16/502,031

(22) Filed: Jul. 3, 2019

(65) Prior Publication Data
US 2020/0011413 A1 Jan. 9, 2020

(30) Foreign Application Priority Data
Jul. 4, 2018 (JP) .............................. JP2018-127785

(51) Int. Cl.
*F16H 61/04* (2006.01)
*B60W 10/10* (2012.01)
(Continued)

(52) U.S. Cl.
CPC ......... *F16H 61/0403* (2013.01); *B60W 10/10* (2013.01); *B60W 50/029* (2013.01); *G01P 3/42* (2013.01); *F16H 2061/2823* (2013.01)

(58) Field of Classification Search
CPC ........ F16H 61/0403; F16H 2061/2823; B60W 10/10; B60W 50/029; G01P 3/42
See application file for complete search history.

(56) References Cited

U.S. PATENT DOCUMENTS

| 6,992,453 B2 * | 1/2006 | Yasui | ...................... F16H 61/28 318/53 |
| 7,013,746 B2 * | 3/2006 | Matsumura | ......... F16H 61/0403 477/34 |

(Continued)

FOREIGN PATENT DOCUMENTS

| JP | S6343054 | 2/1988 |
| JP | 2001304394 | 10/2001 |

(Continued)

OTHER PUBLICATIONS

Nishimura (machine translation)—Rotational Synchronization Controller for Transmission, Oct. 31, 2001.*

(Continued)

*Primary Examiner* — Tinh Dang
(74) *Attorney, Agent, or Firm* — JCIPRNET (57) ABSTRACT

A vehicle control device includes a control device that performs synchronization control of a synchronization mechanism on a vehicle, the vehicle including an input shaft, an intermediate shaft to which rotational power is transmitted, a shift gear that is synchronized with the intermediate shaft, and a synchronization mechanism that synchronizes the input side synchronization element with the output side synchronization element, and the control device includes a first synchronization mode in which the differential rotation is calculated on the basis of the rotational speed of the intermediate shaft, and a second synchronization mode in which the differential rotation is calculated on the basis of the rotational speed of the input shaft, and performs synchronization control in the first synchronization mode when performing the synchronization control, and performs the synchronization control in the second synchronization mode in a case in which the synchronization control does not proceed.

6 Claims, 6 Drawing Sheets

(51) Int. Cl.
*B60W 50/029* (2012.01)
*G01P 3/42* (2006.01)
*F16H 61/28* (2006.01)

(56) References Cited

U.S. PATENT DOCUMENTS

| | | | | |
|---|---|---|---|---|
| 7,231,844 B2* | 6/2007 | Yasui | ................ | F16H 61/2807 |
| | | | | 477/34 |
| 7,350,433 B2* | 4/2008 | Yasui | ................ | F16H 61/2807 |
| | | | | 192/53.3 |
| 8,437,931 B2* | 5/2013 | Asplund | ............ | F16H 61/2807 |
| | | | | 701/64 |
| 8,714,040 B2* | 5/2014 | Oh | ......................... | F16H 3/093 |
| | | | | 74/325 |
| 10,041,568 B2* | 8/2018 | Park | ....................... | F16H 3/089 |

FOREIGN PATENT DOCUMENTS

| | | |
|---|---|---|
| JP | 2002286130 | 10/2002 |
| JP | 2013049323 | 3/2013 |

OTHER PUBLICATIONS

"Office Action of Japan Counterpart Application", dated Jun. 16, 2020, with English translation thereof, p. 1-p. 8.

* cited by examiner

CONTROL DEVICE FOR VEHICLE

CROSS-REFERENCE TO RELATED APPLICATION

This application claims the priority benefits of Japan Patent Application No. 2018-127785, filed on Jul. 4, 2018. The entirety of the above-mentioned patent application is hereby incorporated by reference herein and made a part of this specification.

BACKGROUND

Technical Field

The disclosure relates to a vehicle control device that performs travel control for a vehicle having a transmission mechanism, and more particularly, to a vehicle control device that performs synchronization control when the transmission mechanism is in gear.

Description of Related Art

Various rotation sensors for detecting the rotational speed of input and output shafts and other rotation shafts are mounted in a vehicle in order to control an operation of a transmission mechanism mounted in the vehicle. In order to secure reliability of information from these rotation sensors, various schemes for recognizing degradation of detection functions when the detection functions of the rotation sensors are degraded for some reason have been proposed in the related art (for example, Patent Document 1). Thus, in a case in which degradation of the detection functions of the rotation sensors has been recognized, a control device then performs appropriate control on the transmission mechanism or the like such that appropriate travel control is possible.

However, in a case in which synchronization of shift gears is performed in shift control, it may be difficult to directly recognize degradation of the detection functions of the rotation sensors, for example, in a case before the synchronization of the shift gears is performed in an off-gear state. In this case, the synchronization control will not appropriately proceed and the shift control will come to a standstill.

Patent Documents

[Patent Document 1] Japanese Laid-open No. 2013-049323

The disclosure has been made in view of the above-described points, and the disclosure provides a vehicle control device capable of performing appropriate shift control even before directly recognizing degradation of detection functions of some of rotation sensors in a case in which the detection functions of some of the rotation sensors are degraded.

SUMMARY

A vehicle control device according to the disclosure includes a control device (11) that performs synchronization control of a synchronization mechanism (82, 84) on a vehicle (1) on the basis of a differential rotation (dN) between an input side synchronization element (82a, 84a) and an output side synchronization element (82b, 84b), the vehicle including a power source (2) that generates rotational power to be transmitted to a driving wheel (WR, WL); an input shaft (2a) that is connected to the power source (2); an output shaft (63) that transmits the rotational power to the driving wheel (WR, WL); an intermediate shaft (62) that transmits the rotational power transmitted from the input shaft (2a) to the output shaft (63); a shift gear (72, 74, 76) that is synchronized with the intermediate shaft (62) and transmits power to the output shaft (63); and the synchronization mechanism (82, 84) including the input side synchronization element (82a, 84a) disposed on the intermediate shaft (62) and the output side synchronization element (82b, 84b) that transmits power to the output shaft (63), and synchronizing the input side synchronization element (82a, 84a) with the output side synchronization element (82b, 84b), wherein the control device (11) includes a first synchronization mode (Md1) in which the differential rotation (dN) is calculated on the basis of the rotational speed of the intermediate shaft (62), and a second synchronization mode (Md2) in which the differential rotation (dN) is calculated on the basis of the rotational speed of the input shaft (2a) in the synchronization control, the control device performing the synchronization control in the first synchronization mode (Md1) when performing the synchronization control of the shift gear (72, 74), and performing the synchronization control in the second synchronization mode (Md2) in a case in which the synchronization control does not proceed.

The reference numerals in the above parentheses indicate reference numerals of corresponding components of an embodiment to be described below, as an example of the disclosure.

DESCRIPTION OF THE EMBODIMENTS

The control device normally uses the first synchronization mode when performing synchronization control of the shift gears. In the first synchronization mode, the differential rotation is calculated on the basis of the rotational speed of the intermediate shaft, but in a case in which a problem arises in detecting the rotational speed of the intermediate shaft, for example, when the function of the rotation sensor of the intermediate shaft has degraded, a calculated value of the differential rotation does not decrease and the synchronization control does not proceed. In this case, the control device performs calculation of the differential rotation on the basis of the second synchronization mode in which the rotational speed of the input shaft is used, instead of the first synchronization mode in which the rotational speed of the intermediate shaft is used. Thus, it is possible to estimate an appropriate differential rotation by estimating the rotational speed of the intermediate shaft from the rotational speed of the input shaft using the second synchronization mode, if necessary. As a result, appropriate synchronization control proceeds. Thus, it is possible to cause the synchronization control to proceed and to perform appropriate shift control even before directly recognizing degradation of a detection function of detecting the rotational speed of the intermediate shaft, that is, before directly recognizing degradation of the function of the rotation sensor that detects the rotational speed of the intermediate shaft.

Further, in the above-described vehicle control device, the control device (11) may perform the synchronization control in the first synchronization mode (Md1), and transitions to the second synchronization mode (Md2) in a case in which the differential rotation (dN) is equal to or greater than a predetermined value when a predetermined time has elapsed after acquisition of an instruction to start the synchronization control.

Thus, in a case in which the differential rotation is equal to or greater than the predetermined value even when a predetermined time has elapsed after the acquisition of the instruction to start the synchronization control, transition to the second synchronization mode is performed. Then, in a case in which the rotational speed of the intermediate shaft cannot be appropriately detected, it immediately transitions to the second synchronization mode, and an appropriate differential rotation is ascertained from the rotational speed of the input shaft. Then, it is possible to cause the synchronization control to immediately proceed.

Further, in the above-described vehicle control device, the vehicle (1) may include a power transmission element (C2) that adjusts a rotational power transmitted from the input shaft (2a) to the intermediate shaft (62), and the control device (11) connects the power transmission element (C2) in a case in which the differential rotation (dN) is equal to or greater than a predetermined value when the control device performs the synchronization control in the first synchronization mode (Md1).

Thus, when the synchronization control is performed in the first synchronization mode, the power transmission element is connected in a case in which the differential rotation is equal to or greater than the predetermined value, and the rotation of the input shaft and the rotation of the intermediate shaft are interlocked due to the connection of the power transmission element. Therefore, in a case in which the second synchronization mode in which the rotational speed of the intermediate shaft is estimated from the rotational speed of the input shaft is used, it is possible to estimate the rotational speed of the intermediate shaft more accurately and to perform more appropriate synchronous control. Further, when the power transmission element is connected, the rotational power is transmitted from the input shaft to the intermediate shaft, and therefore, the rotational speed of the intermediate shaft is increased. Then, it is possible to decrease the differential rotation in a short time, and to set the predetermined time for determining whether or not the differential rotation has been decreased to be shorter. As a result, it is possible to select the synchronization mode more rapidly.

Further, in the above-described vehicle control device, the control device (11) may disconnect the power transmission element (C2) in a case in which the differential rotation (dN) becomes smaller than the predetermined value.

Thus, in a case in which the connection of the power transmission element for rotational alignment of the input shaft and the intermediate shaft is not necessary, the power transmission element is disconnected. Accordingly, it is possible to perform efficient control.

In the above-described vehicle control device, the power transmission element (C2) of the vehicle (1) may include a first power transmission part (C2a) on the input shaft (2a) side and a second power transmission part (C2b) on the intermediate shaft (62) side, and may be a wet clutch in which a space between the first power transmission part (C2a) and the second power transmission part (C2b) is filled with hydraulic fluid.

Thus, when the power transmission element having a configuration in which the first power transmission part on the input shaft side and the second power transmission part on the intermediate shaft side are included and a space between the first power transmission part and the second power transmission part is filled with hydraulic fluid is adopted, rotational power is transmitted from the first power transmission part to the second power transmission part via the hydraulic fluid even when the power transmission element is not connected. Accordingly, the intermediate shaft is rotated together with the input shaft in a case in which there is no synchronization of the synchromesh mechanism. Therefore, the estimation of the rotational speed of the intermediate shaft using the rotational speed of the input shaft is more appropriate.

Further, in the above-described vehicle control device, the control device (11) may confirm the rotational speed of the intermediate shaft (62) after the control device performs the synchronization control in the second synchronization mode (Md2), and perform a subsequent synchronization control in the second synchronization mode (Md2) in a case in which the control device determines that a detection function of detecting the rotational speed of the intermediate shaft (62) has degraded.

Thus, after it is determined that a detection function of the rotational speed of the intermediate shaft has been degraded, the synchronization control is performed in the second synchronization mode in which the rotation of the intermediate shaft is estimated from the rotation of the input shaft, rather than the first synchronization mode in which the rotational speed of the intermediate shaft has been used. Accordingly, it is possible to perform rapid and appropriate synchronization control.

According to the vehicle control device according to the embodiments of the disclosure, it is possible to perform appropriate shift control even before directly recognizing degradation of detection functions of some of rotation sensors in a case in which the detection functions of some of the rotation sensors are degraded.

Figure 1:
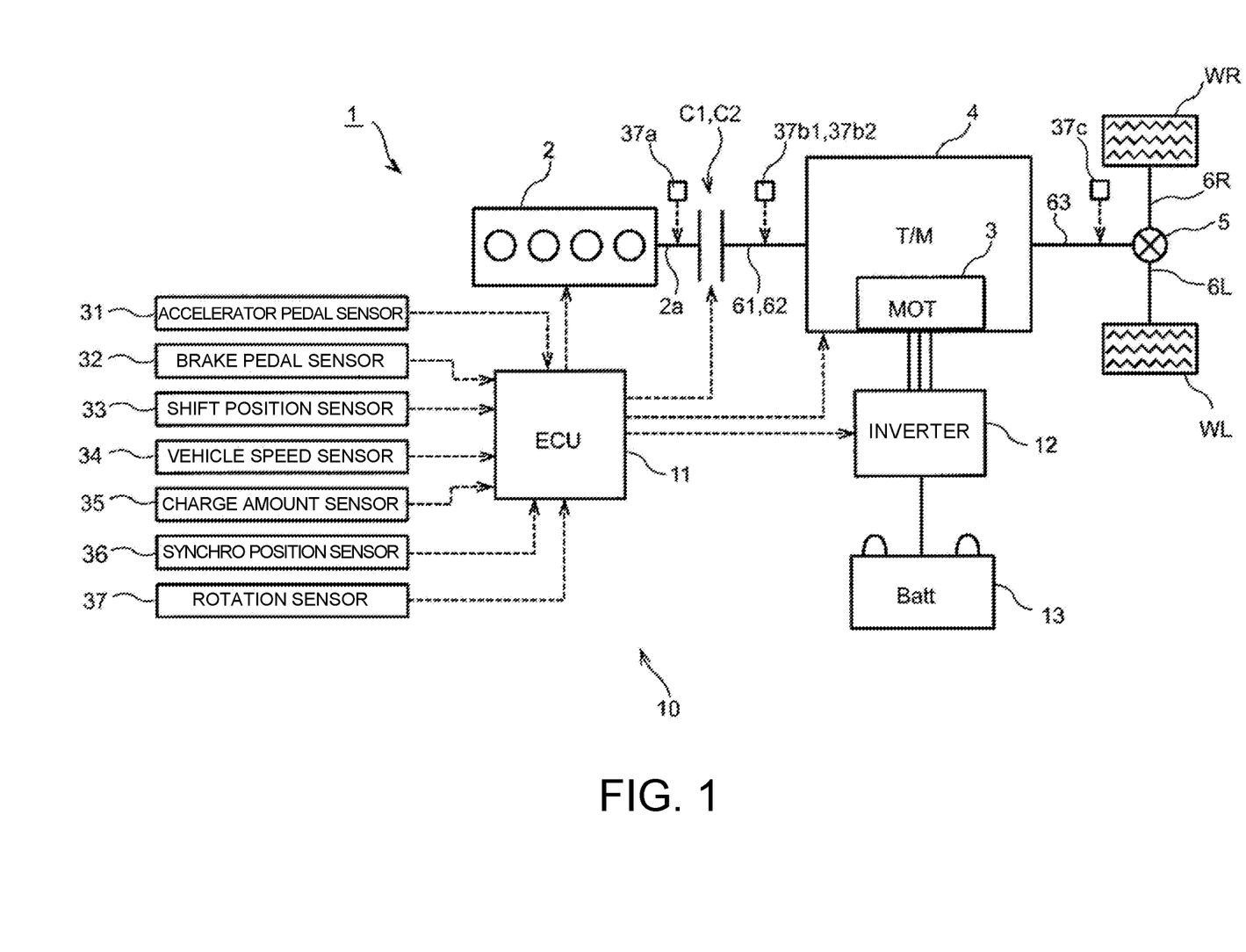
FIG. 1 is a schematic diagram of a vehicle including a vehicle control device according to an embodiment.

Hereinafter, an embodiment of the present disclosure will be described in detail with reference to the accompanying drawings. FIG. 1 is a schematic diagram of a vehicle 1 including a vehicle control device 10 according to the embodiment. The vehicle 1 of the embodiment is a vehicle 1 which is a hybrid vehicle including an engine 2 (an internal combustion engine) and a motor 3 (an electric motor), which constitute a power source, as illustrated in FIG. 1. The vehicle 1 further includes an inverter 12 for controlling the motor 3, a battery 13 (a storage battery), a transmission 4, a first clutch C1 and a second clutch C2, a differential mechanism 5, right and left driving shafts 6R and 6L, and right and left driving wheels WR and WL. With this configuration, rotation driving force of the engine 2 and the motor 3 is transmitted to the right and left driving wheels WR and WL via the transmission 4, the differential mechanism 5, and the driving shafts 6R and 6L.

The vehicle control device 10 includes an electronic control unit 11 (ECU) as a control device. The electronic control unit 11 controls the engine 2, the motor 3, the transmission 4, the first clutch C1 and the second clutch C2, the differential mechanism 5, the inverter 12, and the battery 13 respectively. It should be noted that the electronic control unit 11 is not limited to an electronic control unit configured as one unit. For example, the electronic control unit 11 may be configured of a plurality of ECUs such as an engine ECU for controlling the engine 2, a motor generator ECU for controlling the motor 3 or the inverter 12, a battery ECU for controlling the battery 13, and an automatic transmission (AT) ECU for controlling the transmission 4.

Further, the electronic control unit 11 of the embodiment controls the engine 2 and the motor 3 and performs control of charging and discharging of the battery 13, a shift operation of the transmission 4 and a synchronization operation at the time of shift, and engagement and disengagement of the first clutch C1 and the second clutch C2. Details thereof will be described below.

The engine 2 is an internal combustion engine that generates a rotation driving force for causing the vehicle 1 to travel by mixing fuel with air and burning the fuel according to a fuel injection command. The motor 3 causes the vehicle 1 to travel using electrical energy of the battery 13 at the time of traveling using both the engine 2 and the motor 3 or traveling using the motor 3 alone. Further, the motor 3 functions as a generator that generates electric power through regeneration at the time of deceleration of the vehicle 1.

Further, various control signals of a plurality of control parameters are input to the electronic control unit 11. Examples of the control signal include an accelerator pedal opening degree from an accelerator pedal sensor 31 that detects an amount of depression of an accelerator pedal, a brake pedal opening degree from a brake pedal sensor 32 that detects an amount of depression of a brake pedal, a shift position from a shift position sensor 33 that detects a shift gear stage (a gear stage), a vehicle speed from a vehicle speed sensor 34 that detects a vehicle speed, an amount of charge from a charge amount sensor 35 that measures a state of charge (SOC) of the battery 13, a position of each synchromesh mechanism from a synchro position sensor 36, and the rotational speed from a rotation sensor 37 that detects the rotational speed of each rotation shaft. The electronic control unit 11 performs control on the basis of information from these sensors.

The rotation sensor 37 according to the embodiment includes at least a rotation sensor 37*a* that detects the rotational speed of a crankshaft 2*a* (an input shaft) of the engine 2, a rotation sensor 37*b*1 that detects the rotational speed of a first shaft 61 of the transmission 4, a rotation sensor 37*b*2 that detects the rotational speed of a second shaft 62 (an intermediate shaft) of the transmission 4, and a rotation sensor 37*c* that detects the rotational speed of a countershaft 63 (an output shaft) of the transmission 4. Each rotation sensor 37 may be configured to be disposed directly on a rotation shaft of a detection target, or may be configured to be disposed on another rotation shaft connected via a gear attached to the rotation shaft of the detection target.

Figure 2:
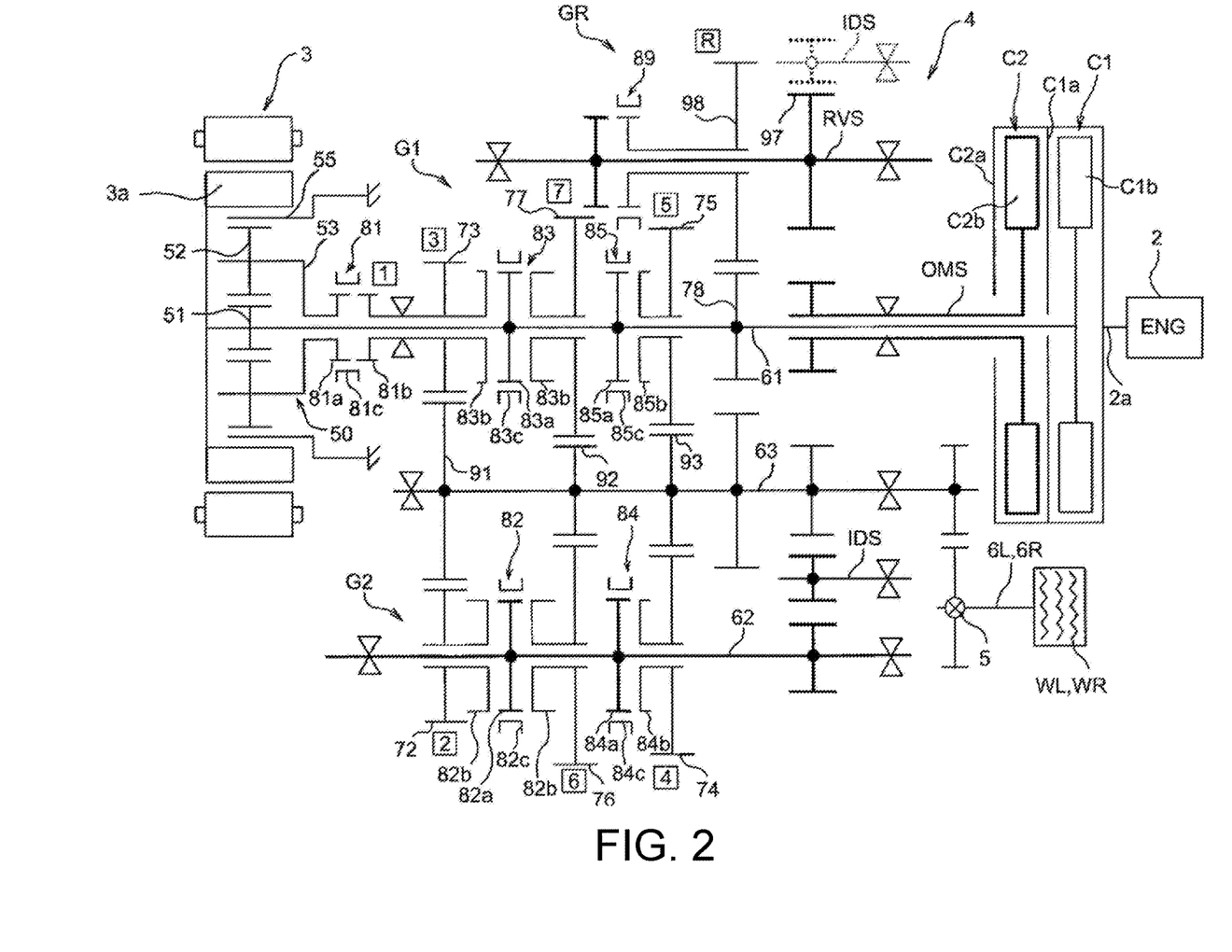
FIG. 2 is a skeleton diagram of a transmission of the embodiment.

A configuration of the transmission 4 included in the vehicle 1 of the embodiment will be described with reference to FIG. 2. FIG. 2 is a skeleton diagram of the transmission 4 of the embodiment. The transmission 4 is a parallel-shaft transmission with seven forward gears and one backward gear, and is a dual clutch transmission (DCT).

The transmission 4 includes the first clutch C1 and the second clutch C2. The first clutch C1 includes a clutch plate C1*a* on the crankshaft 2*a* side and a clutch plate C1*b* on the first shaft 61 side, and a space between the clutch plate C1*a* and the clutch plate C1*b* is filled with hydraulic fluid. Further, the second clutch C2 includes a clutch plate C2*a* (a first power transmission part) on the crankshaft 2*a* side and a clutch plate C2*b* (a second power transmission part) on the second shaft 62 side, and a space between the clutch plate C2*a* and the clutch plate C2*b* is filled with hydraulic fluid. Thus, the first clutch C1 and the second clutch C2 are wet clutches.

The transmission 4 includes the first shaft 61 selectively connected to the crankshaft 2*a* of the engine 2 via the first clutch C1, the second shaft 62 selectively connected to the crankshaft 2*a* of the engine 2 via the second clutch C2, and the countershaft 63 connected to the first shaft 61 and the second shaft 62 via a shift gear mechanism. Gears for odd-numbered stages (1, 3, 5, and 7) are disposed on the first shaft 61, and gears for even-numbered stages (2, 4, and 6) are disposed on the second shaft 62. The countershaft 63 is connected to the differential mechanism 5 and generates rotational power corresponding to the gear stage selected for the driving wheels WR and WL.

Further, a planetary gear mechanism 50 is disposed on one end side of the first shaft 61. Further, a rotor 3*a* of the motor 3 is connected to the first shaft 61, and the rotor 3*a* of the motor 3 is configured to rotate around the planetary gear mechanism 50. With such a configuration, the transmission 4 functions as a transmission for a hybrid vehicle with the engine 2 and the motor 3 as a driving source of the vehicle 1.

An outer shaft OMS is connected to the output side of the second clutch C2. The outer shaft OMS is disposed concentrically with the first shaft 61 to form an outer cylinder of the first shaft 61. The outer shaft OMS is constantly engaged with a reverse shaft RVS and the second shaft 62 via the idle shaft IDS, and a rotational output of the second clutch C2 is transmitted to the reverse shaft RVS and the second shaft 62. The shafts are parallel to one another.

A first transmission mechanism G1 for realizing the gear stages of odd-numbered stages will be described. A third-gear driving gear 73, a seventh-gear driving gear 77, and a fifth-gear driving gear 75 are respectively concentrically disposed as shift gears on the first shaft 61 so that gears are relatively rotatable.

The planetary gear mechanism 50 is disposed at one end of the first shaft 61 close to the motor 3. The planetary gear mechanism 50 includes a sun gear 51, a pinion gear 52, and a ring gear 55. The sun gear 51 is fixed to the first shaft 61 and rotates integrally with the first shaft 61 and the motor 3. The ring gear 55 is fixed to a casing of the transmission 4 and is configured to generate a shift output from a carrier 53 of the pinion gear 52.

A first-gear synchromesh mechanism 81 is provided between the carrier 53 of the planetary gear mechanism 50 and the third-gear driving gear 73 on the first shaft 61. Further, a third-seventh gear synchromesh mechanism 83 is provided between the third-gear driving gear 73 and the seventh-gear driving gear 77. Further, a fifth-gear synchromesh mechanism 85 is provided corresponding to the fifth-gear driving gear 75. A first synchronization mechanism that performs synchronization on the first shaft 61 is constituted by the first-gear synchromesh mechanism 81, the third-seventh gear synchromesh mechanism 83, and the fifth-gear synchromesh mechanism 85.

Input side synchronization elements 81*a*, 83*a*, and 85*a*, output side synchronization elements 81*b*, 83*b*, and 85*b*, and sleeves 81*c*, 83*c*, and 85*c* provided slidably in an axial direction are provided in the respective synchromesh mechanisms 81, 83, and 85 as the first synchronization mechanism.

The sleeves 81*c*, 83*c*, and 85*c* are slid and the desired input side synchronization elements 81*a*, 83*a*, and 85*a* are synchronized with the corresponding output side synchronization elements 81*b*, 83*b*, and 85*b*. Accordingly, rotational power is transmitted from the input side synchronization elements 81*a*, 83*a*, and 85*a* to the output side synchronization elements 81*b*, 83*b*, and 85*b*.

With such a configuration, when any one of the desired odd-numbered shift gears (the planetary gear mechanism 50, the third-gear driving gear 73, the fifth-gear driving gear 75, and the seventh-gear driving gear 77) is selected, the first synchronization mechanism disposed on the first shaft 61 is selectively synchronized. Accordingly, the selected desired odd-numbered shift gear is connected to the first shaft 61.

Each driving gear of the first transmission mechanism G1 meshes with a corresponding gear among output gears provided on the countershaft 63. Specifically, the third-gear driving gear 73 meshes with the first output gear 91, the seventh-gear driving gear 77 meshes with the second output gear 92, and the fifth-gear driving gear 75 meshes with the third output gear 93, thereby rotationally driving the countershaft 63.

The second transmission mechanism G2 for realizing the gear stages of even-numbered stages will be described. A second-gear driving gear 72, a sixth-gear driving gear 76, and a fourth-gear driving gear 74 are respectively concentrically disposed as shift gears on the second shaft 62 so that the gears are relatively rotatable.

A second-sixth gear synchromesh mechanism 82 is provided between the second-gear driving gear 72 and the sixth-gear driving gear 76, and a fourth-gear synchromesh mechanism 84 is provided corresponding to the fourth-gear driving gear 74.

The second-sixth gear synchromesh mechanism 82 is provided between the second-gear driving gear 72 and the sixth-gear driving gear 76. Further, a fourth-gear synchromesh mechanism 84 is provided corresponding to the fourth-gear driving gear 74. A second synchronization mechanism (a synchronization mechanism) that performs synchronization on the second shaft 62 is constituted by the second-sixth gear synchromesh mechanism 82 and the fourth-gear synchromesh mechanism 84.

Input side synchronization elements 82*a* and 84*a*, output side synchronization elements 82*b* and 84*b*, and sleeves 82*c* and 84*c* provided slidably in an axial direction are provided in the respective synchromesh mechanisms 82 and 84 as the second synchronization mechanism. The sleeves 82*c* and 84*c* are slid and the desired input side synchronization elements 82*a* and 84*a* are synchronized with the corresponding output side synchronization elements 82*b* and 84*b*. Accordingly, rotational power is transmitted from the input side synchronization elements 82*a* and 84*a* to the output side synchronization elements 82*b* and 84*b*.

With such a configuration, when any one of the desired even-numbered shift gears (the second-gear driving gear 72, the fourth-gear driving gear 74, and the sixth-gear driving gear 76) is selected, the second synchronization mechanism disposed on the second shaft 62 is selectively synchronized. Accordingly, the selected desired even-numbered shift gear is connected to the second shaft 62.

Each driving gear of the second transmission mechanism G2 meshes with a corresponding gear among the output gears provided on the countershaft 63. Specifically, the second-gear driving gear 72 meshes with the first output gear 91, the sixth-gear driving gear 76 meshes with the second output gear 92, and the fourth-gear driving gear 74 meshes with the third output gear 93, thereby rotationally driving the countershaft 63.

A reverse transmission mechanism GR for realizing a reverse stage will be described. A gear 97 engaged with the idle shaft IDS is fixed to the reverse shaft RVS. Further, a reverse gear stage for selectively coupling the reverse shaft RVS to the first shaft 61 is provided on the outer periphery of the reverse shaft RVS. The reverse gear stage includes a reverse driving gear 98 concentrically provided to be rotatable relative to the reverse shaft RVS, a reverse synchromesh mechanism 89 for selectively coupling the reverse driving gear 98 to the reverse shaft RVS, and a gear 78 fixed to the first shaft 61 to mesh with the reverse driving gear 98.

Figure 3:
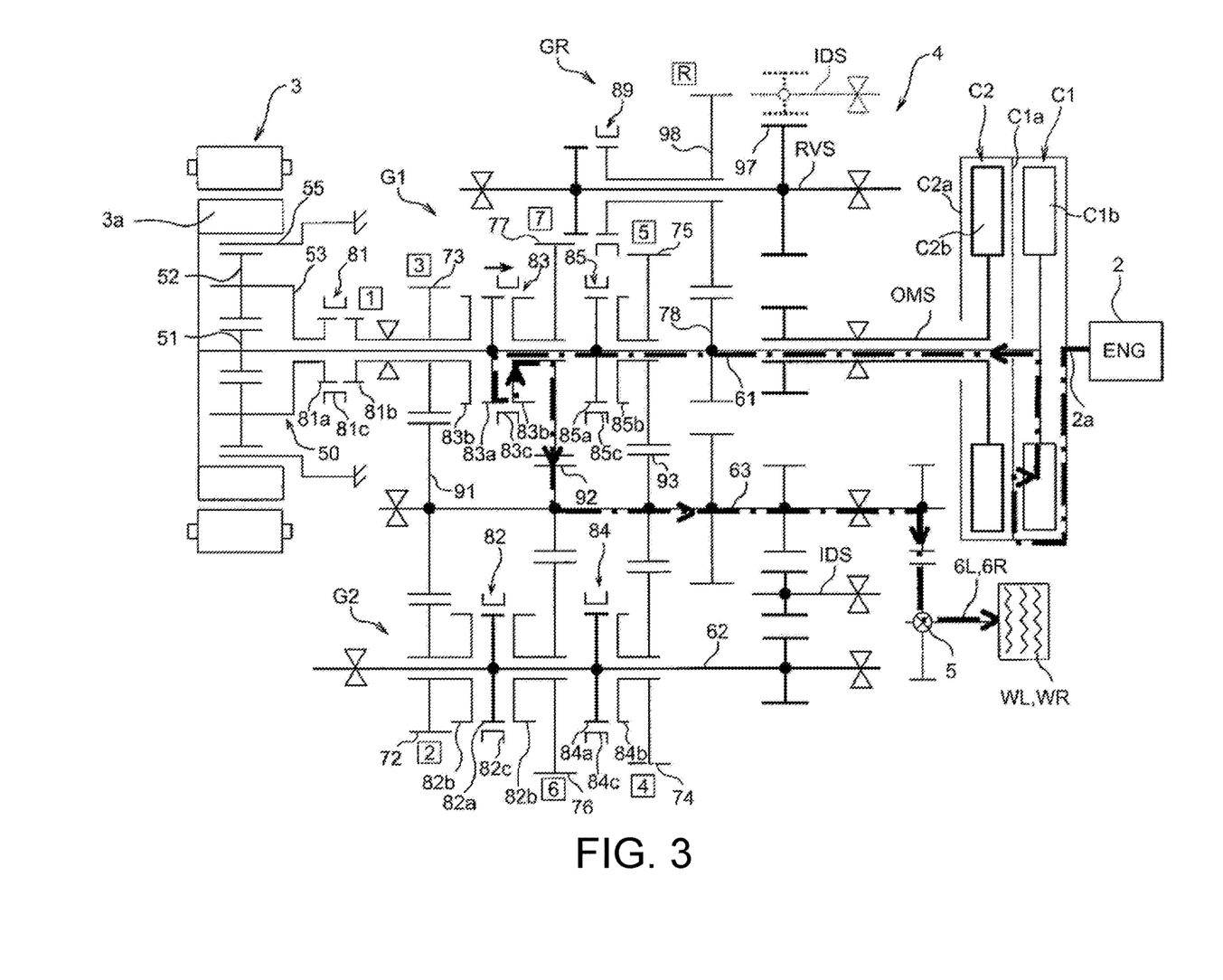
FIG. 3 is a diagram illustrating a power transmission path in a case in which a first transmission mechanism (a seventh gear) is used in the transmission of the embodiment.

An example of the power transmission when the shift gear of the first transmission mechanism G1 is selected by a power of the engine 2 will be described with reference to FIG. 3. FIG. 3 is a diagram illustrating a power transmission path when the first transmission mechanism (the seventh gear) is used in the transmission 4 of the embodiment. FIG. 3 illustrates a state in which the seventh-gear driving gear 77 is in gear by synchronizing the third-seventh gear synchromesh mechanism 83 in the first transmission mechanism G1 with the seventh-gear driving gear 77 side. It should be noted that description of power transmission from the motor 3 will be omitted herein.

When the power of the engine 2 is output via the seventh-gear driving gear 77 of the first transmission mechanism G1, the sleeve 83*c* of the third-seventh gear synchromesh mechanism 83 is moved to the seventh-gear driving gear 77. Accordingly, the seventh-gear driving gear 77 is synchronized with the first shaft 61. When the first clutch C1 is engaged, the power transmission path of the crankshaft 2*a* and the power transmission path of the first shaft 61 are connected, such that the power of the engine 2 is transmitted to the first shaft 61, as illustrated in FIG. 3. Then, the power is transmitted to the seventh-gear driving gear 77 via the third-seventh gear synchromesh mechanism 83 and is further transmitted to the second output gear 92 meshing with the seventh-gear driving gear 77, such that the power is transmitted to the countershaft 63. The power transmitted to the countershaft 63 is transmitted to the driving wheels WR and WL via the differential mechanism 5 and the driving shafts 6R and 6L.

Figure 4:
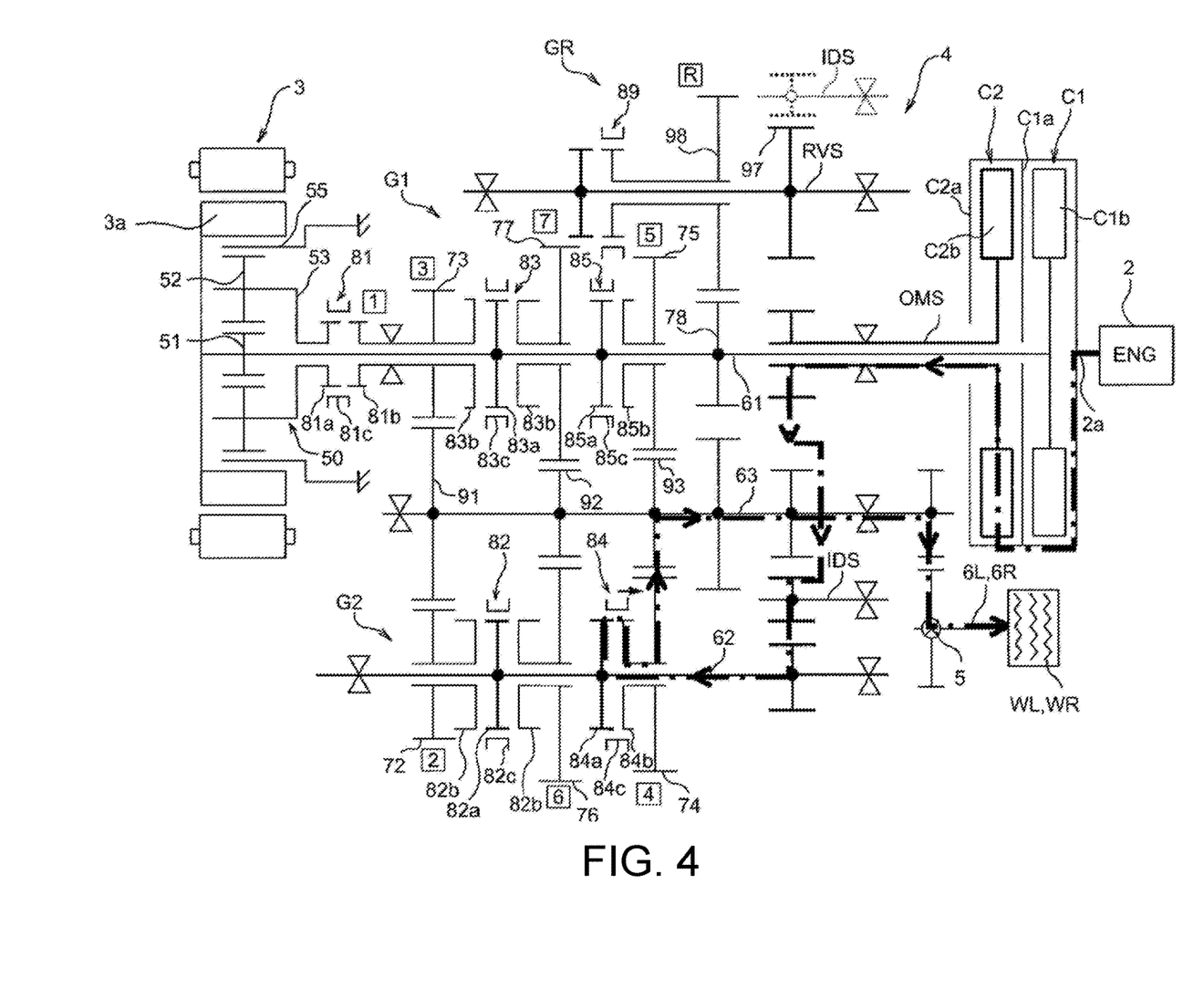
FIG. 4 is a diagram illustrating a power transmission path in a case in which a second transmission mechanism (a fourth gear) is used in the transmission of the embodiment.

An example of the power transmission when the shift gear of the second transmission mechanism G2 is selected by a power of the engine 2 will be described with reference to FIG. 4. FIG. 4 is a diagram illustrating a power transmission path when the second transmission mechanism (the fourth gear) is used in the transmission of the embodiment. FIG. 4 illustrates a state in which the fourth-gear driving gear 74 is in gear by synchronizing the fourth-gear synchromesh mechanism 84 with the fourth-gear driving gear 74 in the second transmission mechanism G2. It should be noted that description of a power transmission path for the power of the motor 3 will be omitted herein.

When the power of the engine 2 is output via the fourth-gear driving gear 74 of the second transmission mechanism G2, the sleeve 84*c* of the fourth-gear synchromesh mechanism 84 is moved to the fourth-gear driving gear 74. Accordingly, the fourth-gear driving gear 74 is synchronized with the second shaft 62. When the second clutch C2 is engaged, the power transmission path of the crankshaft 2*a* and the power transmission path of the second shaft 62 are connected, such that the power of the engine 2 is transmitted to the second shaft 62, as illustrated in FIG. 4. Then, the power is transmitted to the fourth-gear driving gear 74 via the fourth-gear synchromesh mechanism 84 and is further transmitted to the third output gear 93 meshing with the fourth-gear driving gear 74, such that the power is transmitted to the countershaft 63. The power transmitted to the countershaft 63 is transmitted to the driving wheels WR and WL via the differential mechanism 5 and the driving shafts 6R and 6L.

[Synchronization Control]

Next, synchronization control of the electronic control unit 11 will be described. Hereinafter, a method in which the electronic control unit 11 performs synchronization control of the fourth-gear synchromesh mechanism 84 when the electronic control unit 11 in a driven state performs shift control from the seventh-gear driving gear 77 in the first transmission mechanism G1 to the fourth-gear driving gear 74 in the second transmission mechanism G2 will be illustrated and described. The electronic control unit 11 similarly performs synchronization control to synchronize other shift gears.

When the electronic control unit 11 has acquired an instruction to start the synchronization control in the fourth-gear synchromesh mechanism 84, the electronic control unit 11 calculates a differential rotation dN, which is a difference between the rotational speed of the input side synchronization element 84a and the rotational speed of the output side synchronization element 84b. Here, in a case in which a synchronization operation is set to be permitted when the differential rotation dN is smaller than a predetermined value, the electronic control unit 11 does not move the sleeve 84c and does not perform the synchronization operation when the differential rotation dN is equal to or greater than the predetermined value. On the other hand, when the differential rotation dN is smaller than the predetermined value, the electronic control unit 11 starts the synchronization operation.

Here, the electronic control unit 11 of the embodiment has two synchronization modes including a first synchronization mode Md1 and a second synchronization mode Md2 in order to calculate the differential rotation dN, and switches between theses modes, as necessary.

In the first synchronization mode Md1, the rotational speed of the input side synchronization element 84a is calculated on the basis of the rotational speed detected by the rotation sensor 37b2 that detects the rotational speed of the second shaft 62.

In the second synchronization mode Md2, the rotational speed of the second shaft 62 is estimated from the rotational speed detected by the rotation sensor 37a that detects the rotational speed of the crankshaft 2a, and the rotational speed of the input side synchronization element 84a is calculated on the basis of an estimated rotational speed of the second shaft 62.

Further, in any of the first synchronization mode Md1 and the second synchronization mode Md2, the rotational speed of the output side synchronization element 84b is calculated on the basis of the rotational speed Nc detected by the rotation sensor 37c that detects the rotational speed of the countershaft 63.

Figure 5:
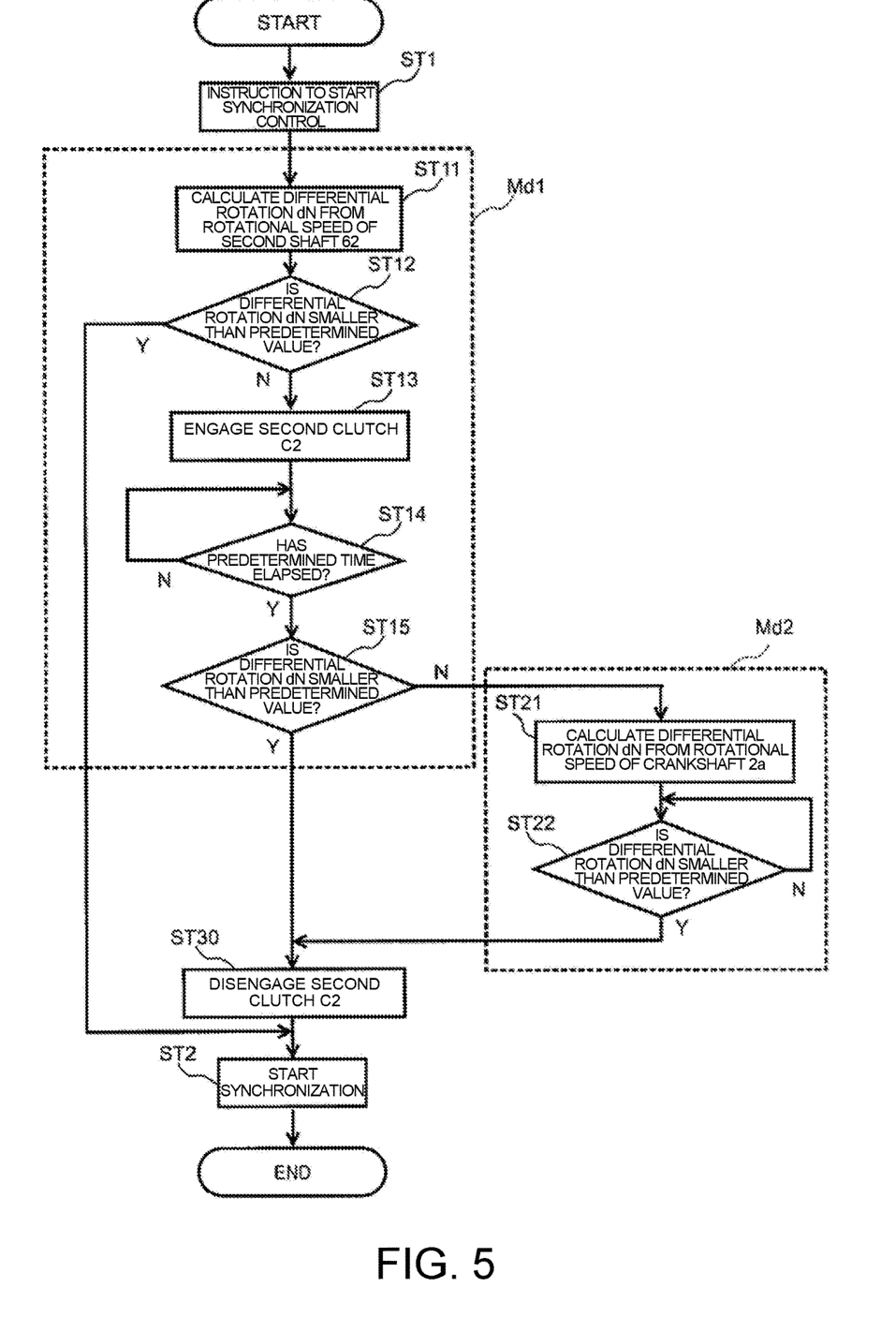
FIG. 5 is a flowchart illustrating a control procedure of the vehicle control device of the embodiment.

A procedure in which the electronic control unit 11 of the vehicle control device 10 selects the first synchronization mode Md1 and the second synchronization mode Md2 will be described with reference to FIG. 5. FIG. 5 is a flowchart illustrating a control procedure of the vehicle control device 10 of the embodiment.

As illustrated in FIG. 5, when the electronic control unit 11 acquires an instruction to start the synchronization control (step ST1), the synchronization control is normally performed in the first synchronization mode Md1. In the first synchronization mode Md1, the differential rotation dN is calculated on the basis of the rotational speed detected by the rotation sensor 37b2 of the second shaft 62 (step ST11).

Here, it is determined whether or not the differential rotation dN is smaller than a predetermined value (step ST12). When the differential rotation dN is smaller than the predetermined value, the movement of the sleeve 84c is permitted and the synchronization operation is started (step ST2).

On the other hand, in step ST12, when the differential rotation dN is equal to or greater than the predetermined value, the second clutch C2 is engaged (step ST13). Then, a power transmission path between the crankshaft 2a and the second shaft 62 is connected and rotational power is transmitted from the crankshaft 2a to the second shaft 62. Therefore, the rotational speed of the second shaft 62 increases, and the rotational speed of the input side synchronization element 84a disposed on the second shaft 62 also increases. In this case, since the rotational speed of the input side synchronization element 84a can be made close to the rotational speed of the output side synchronization element 84b, the differential rotation dN can be expected to be smaller than the predetermined value in a short time.

After a predetermined time has elapsed (step ST14), it is determined again whether the differential rotation dN has become smaller than the predetermined value (step ST15). Here, when the differential rotation dN has become smaller than the predetermined value, the second clutch C2 already in an engaged state is disengaged (step ST30), and the synchronization operation is started (step ST2).

On the other hand, a detection function of the rotation sensor 37b2 may have degraded when the differential rotation dN is equal to or greater than the predetermined value in step ST15 in spite of the fact that the second clutch C2 is engaged (step ST13) and the predetermined time has elapsed (step ST14). In this case, a transition from the first synchronization mode Md1 to synchronization control in the second synchronization mode Md2 occurs.

In the second synchronization mode Md2, the rotational speed of the second shaft 62 is estimated from the rotational speed detected by the rotation sensor 37a of the crankshaft 2a, and the differential rotation dN is calculated on the basis of the estimated rotational speed that has been estimated here (step ST21).

Then, when the differential rotation dN has become smaller than the predetermined value (step ST22), the second clutch C2 already in the engaged state is disengaged (step ST30), and the synchronization operation is started (step ST2).

Figure 6:
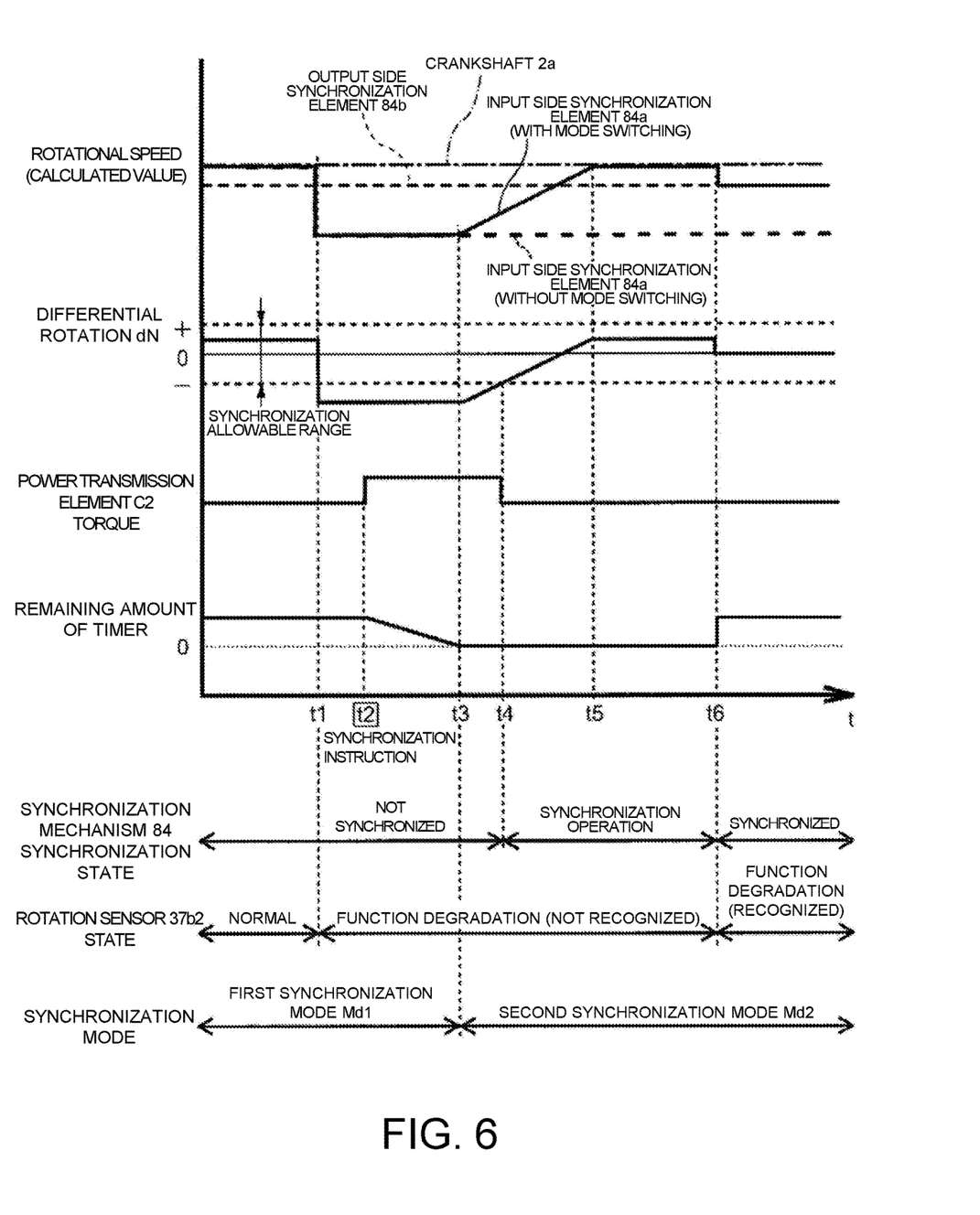
FIG. 6 is a timing chart illustrating a control state of the vehicle control device of the embodiment.

A behavior of each unit when the electronic control unit 11 selects the second synchronization mode Md2 from the first synchronization mode Md1 will be described with reference to FIG. 6. FIG. 6 is a timing chart illustrating a state at a synchronization control time point of the vehicle control device of the embodiment.

In FIG. 6, a control state of the fourth-gear synchromesh mechanism 84 when downshift from the seventh-gear driving gear 77 or the like to the fourth-gear driving gear 74 is performed will be illustrated and described. In a graph, a calculated value of the rotational speed of each rotational element, the differential rotation dN, a torque of the second clutch C2, and a remaining amount of a timer used for control for selecting the synchronization mode are illustrated in order from the top.

In a lower side of the graph in FIG. 6, a synchronized state of the input side synchronization element 84a and the output side synchronization element 84*b* of the fourth-gear synchromesh mechanism 84 (synchronization mechanism), a state of the detection function of the rotation sensor 37*b*2, and a selected synchronization mode are illustrated in order from the top. It should be noted that, in the embodiment, a range in which the synchronization is permitted in the differential rotation dN is determined in advance, and when a difference (an absolute value) between the rotational speed of the input side synchronization element 84*a* and the rotational speed of the output side synchronization element 84*b* is smaller than a predetermined value, the synchronization is permitted.

In FIG. 6, the detection function of the rotation sensor 37*b*2 is normal until time t1. Therefore, the rotation sensor 37*b*2 can accurately detect the rotational speed of the second shaft 62, and the rotational speed of the input side synchronization element 84*a* calculated on the basis of the rotational speed of the second shaft 62 is also a normal value. Therefore, it is possible to obtain the accurate differential rotation dN using the value of the rotation sensor 37*b*2 that detects the rotational speed of the second shaft 62 in the first synchronization mode Md1.

At time t1, it is assumed that the detection function of the rotation sensor 37*b*2 is degraded. In this case, the rotational speed (a detected value) of the second shaft 62 detected by the rotation sensor 37*b*2 is smaller than an actual value. Then, the rotational speed of the input side synchronization element 84*a* calculated on the basis of the detected rotational speed also decreases, and the differential rotation dN, which is a difference from the rotational speed of the output side synchronization element 84*b*, increases. When the differential rotation dN is out of a synchronization allowable range, the synchronization operation cannot be started. It should be noted that the degradation of the detection function of the rotation sensor 37*b*2 cannot be directly recognized even when the detected rotational speed is different from an actual rotational speed due to an off-gear state before synchronization of the synchronization mechanism is performed at time t1. This is because the recognition of the degradation of the detection function of the rotation sensor 37*b*2 of the second shaft 62 is performed on the basis of correlation with the rotational speed of the rotation shaft on the output side.

At time t2, the electronic control unit 11 acquires an instruction to start the synchronization control. In this case, the differential rotation dN is equal to or greater than the predetermined value and is out of the synchronization allowable range. Then, the electronic control unit 11 engages the second clutch C2 and connects a power transmission path from the engine 2 to the second shaft 62. Accordingly, the rotational speed of the input side synchronization element 84*a* increases and the differential rotation dN deceases such that rapid start of the synchronization operation can be expected. Further, at time t2, the electronic control unit 11 starts subtraction of a predetermined time using the timer. The timer measures the predetermined time, which is a reference of switching between the synchronization modes.

At time t3, when the timer detects that the predetermined time has elapsed, the electronic control unit 11 switches the synchronization mode from the first synchronization mode Md1 to the second synchronization mode Md2. In the second synchronization mode Md2, the rotational speed of the second shaft 62 is estimated from the rotational speed (a detected value) of the crankshaft 2*a* detected by the rotation sensor 37*a*, and the rotational speed of the input side synchronization element 84*a* is calculated on the basis of the estimated rotational speed of the second shaft 62.

There are various methods of calculating the estimated rotational speed of the second shaft 62. However, in the embodiment, the estimated rotational speed of the second shaft 62 is calculated to be close to the rotational speed of the crankshaft 2*a* with the elapse of time from a point in time at which the remaining amount of the timer becomes zero (a point in time t3 in the embodiment). Accordingly, it is possible to smoothly perform the synchronization operation.

At time t4, when the differential rotation dN falls within the synchronization allowable range, the electronic control unit 11 starts the synchronization operation. Specifically, the input side synchronization element 84*a* and the output side synchronization element 84*b* are synchronized by moving the sleeve 84*c*. Further, at time t4, since the synchronization operation starts, rotational power for prompting the start of the synchronization operation is not necessary. Therefore, the electronic control unit 11 disengages the second clutch C2.

At time t5, the estimated rotational speed of the second shaft 62 converges to a value of the rotational speed of the crankshaft 2*a*. As described above, since the second clutch C2 is the wet clutch, the power on the crankshaft 2*a* side is transmitted to the second shaft 62 via the hydraulic fluid.

At time t6, the synchronization operation in the fourth-gear synchromesh mechanism 84 is completed. In this case, it is possible to directly recognize the degradation of the detection function of the rotation sensor 37*b*2 by comparing the normal rotational speed of the second shaft 62 when the fourth-gear driving gear 74 is engaged with the rotational speed of the second shaft 62 detected by the rotation sensor 37*b*2 at time t6. At time t6, since the synchronization is completed, the differential rotation dN between the input side synchronization element 84*a* and the output side synchronization element 84*b* is zero. Further, in the embodiment, at time t6, the remaining amount of timer returns to an amount before the subtraction. Accordingly, it is possible to perform switching between the synchronization modes again.

It should be noted that although not illustrated in FIG. 6, the rotational speed of the second shaft 62 is confirmed again by the rotation sensor 37*b*2 after the synchronization control has been performed once in the second synchronization mode Md2, and a subsequent synchronization control may be performed in the second synchronization mode Md2 in a case that it is determined that the detection function of the rotation sensor 37*b*2 that detects the rotational speed of the second shaft 62 is degraded.

As described above, in the embodiment, the electronic control unit 11 normally uses the first synchronization mode Md1 when performing synchronization control of the shift gears. In the first synchronization mode Md1, the differential rotation dN is calculated on the basis of the rotational speed of the second shaft 62, but when the function of the rotation sensor 37*b*2 of the second shaft 62 is degraded, the calculated value of the differential rotation dN does not decrease and the synchronization control does not proceed. In this case, the electronic control unit 11 calculates the differential rotation dN on the basis of the second synchronization mode Md2 instead of the first synchronization mode Md1. Thus, it is possible to estimate an appropriate differential rotation dN by estimating the rotational speed of the second shaft 62 using the second synchronization mode Md2, if necessary. As a result, appropriate synchronization control proceeds. Thus, it is possible to cause the synchronization control to proceed and to perform appropriate shift control even before directly recognizing degradation of the function of the rotation sensor 37*b*2 that detects the rotational speed of the second shaft 62.

Further, in the embodiment, in a case in which the differential rotation dN is equal to or greater than the predetermined value even when a predetermined time has elapsed after the acquisition of the instruction to start the synchronization control, transition to the second synchronization mode Md2 is performed. Then, when the rotational speed of the second shaft 62 cannot be appropriately detected, the mode immediately transitions to the second synchronization mode Md2, and the appropriate differential rotation dN is ascertained from the rotational speed of the crankshaft 2*a*. Then, it is possible to cause the synchronization control to immediately proceed.

Further, in the embodiment, when the synchronization control is performed in the first synchronization mode Md1, the second clutch C2 is connected in a case in which the differential rotation dN is equal to or greater than the predetermined value. Thus, when the synchronization control is performed in the first synchronization mode Md1, the second clutch C2 is connected in a case in which the differential rotation dN is equal to or greater than the predetermined value, and the rotation of the crankshaft 2*a* and the rotation of the second shaft 62 are interlocked due to the connection (engagement) of the second clutch C2. Therefore, when the second synchronization mode Md2 in which the rotational speed of the second shaft 62 is estimated from the rotational speed of the crankshaft 2*a* is used, it is possible to estimate the rotational speed of the second shaft 62 more accurately and to perform more appropriate synchronous control. Further, when the second clutch C2 is connected, the rotational power is transmitted from the crankshaft 2*a* to the second shaft 62, and therefore, the rotational speed of the second shaft 62 is increased. Then, it is possible to decrease the differential rotation dN between the input side synchronization element 84*a* and the output side synchronization element 84*b* in a short time, and to set the predetermined time for determining whether or not the differential rotation dN has been decreased to be shorter. As a result, it is possible to select the synchronization mode more rapidly.

Further, in the embodiment, the second clutch C2 may be disconnected in a case in which the differential rotation dN has been smaller than the predetermined value. Accordingly, when the connection of the second clutch C2 for rotational alignment of the crankshaft 2*a* and the second shaft 62 is not necessary, the second clutch C2 is disconnected. Accordingly, it is possible to perform efficient control.

Further, in the embodiment, the second clutch C2 is a wet clutch in which the space between the clutch plate C2*a* and the clutch plate C2*b* is filled with hydraulic fluid. Thus, when the second clutch C2 is the wet clutch, the rotational power is transmitted from the clutch plate C2*a* to the clutch plate C2*b* via the hydraulic fluid even when the second clutch C2 is not connected. Accordingly, the second shaft 62 is rotated together with the crankshaft 2*a* in a case in which there is no synchronization of the fourth-gear synchromesh mechanism 84. Therefore, the estimation of the rotational speed of the second shaft 62 using the rotational speed of the crankshaft 2*a* is more appropriate.

Further, in the embodiment, after it is determined that the detection function the rotational speed of the second shaft 62 has been degraded, the synchronization control may be performed in the second synchronization mode Md2 in which the rotation of the second shaft 62 is estimated from the rotation of the crankshaft 2*a* instead of using the first synchronization mode Md1 in which the rotational speed of the second shaft 62 has been used. Accordingly, it is possible to perform rapid and appropriate synchronization control.

Although the embodiment of the disclosure has been described above, the disclosure is not limited to the embodiment, and various modifications are possible within the scope of the technical idea described in the claims, the specification, and the drawings. Although a shift operation of a specific shift gear (the fourth-gear driving gear 74) of a specific rotation shaft (the second shaft 62) and a synchronization operation of a specific synchronization mechanism (the fourth-gear synchromesh mechanism 84) corresponding thereto have been illustrated and described in the embodiment, a shift operation of another transmission driving gear of another rotation shaft and a synchronizing operation of the other synchronizing mechanism corresponding thereto may be performed in the embodiment. Further, although the embodiment in which the input shaft is the crankshaft 2*a* of the engine 2 has been described, the input shaft may be a driving shaft of the motor.

What is claimed is:

1. A vehicle control device including a control device configured to perform synchronization control of a synchronization mechanism on a vehicle on the basis of a differential rotation between an input side synchronization element and an output side synchronization element, the vehicle including a power source that generates rotational power to be transmitted to a driving wheel;
an input shaft that is connected to the power source;
an output shaft that transmits the rotational power to the driving wheel;
an intermediate shaft that transmits the rotational power transmitted from the input shaft to the output shaft;
a shift gear that is synchronized with the intermediate shaft and transmits power to the output shaft; and
the synchronization mechanism including the input side synchronization element disposed on the intermediate shaft and the output side synchronization element that transmits power to the shift gear and synchronizing the input side synchronization element with the output side synchronization element, wherein the control device is configured to perform a first synchronization mode in which the differential rotation is calculated on the basis of the rotational speed of the intermediate shaft, and a second synchronization mode in which the differential rotation is calculated on the basis of the rotational speed of the input shaft in the synchronization control, the control device is configured to perform the synchronization control in the first synchronization mode when performing the synchronization control of the shift gear, and performs the synchronization control in the second synchronization mode in a case in which the synchronization control does not proceed.

2. The vehicle control device according to claim 1, wherein the control device is configured to perform the synchronization control in the first synchronization mode, and transitions to the second synchronization mode in a case in which the differential rotation is equal to or greater than a predetermined value when a predetermined time has elapsed after acquisition of an instruction to start the synchronization control.

3. The vehicle control device according to claim 1, wherein the vehicle includes a power transmission element configured to adjust a rotational power transmitted from the input shaft to the intermediate shaft, and the control device is configured to connect the power transmission element in a case in which the differential rotation is equal to or greater than a predetermined value when the control device performs the synchronization control in the first synchronization mode.

4. The vehicle control device according to claim 3, wherein the control device is configured to disconnect the power transmission element in a case in which the differential rotation becomes smaller than the predetermined value.

5. The vehicle control device according to claim 1,
wherein a power transmission element of the vehicle includes a first power transmission part on the input shaft side and a second power transmission part on the intermediate shaft side and is a wet clutch in which a space between the first power transmission part and the second power transmission part is filled with hydraulic fluid.

6. The vehicle control device according to claim 1, wherein the control device is configured to confirm the rotational speed of the intermediate shaft after the control device performs the synchronization control in the second synchronization mode, and performs a subsequent synchronization control in the second synchronization mode in a case in which the control device determines that a detection function of detecting the rotational speed of the intermediate shaft has degraded.

* * * * *